United States Patent

Radlove

[15] 3,658,553

[45] Apr. 25, 1972

[54] DIETARY DRY CAKE MIX

[72] Inventor: Sol B. Radlove, 6125 North Seeley, Chicago, Ill. 60645

[22] Filed: Jan. 14, 1969

[21] Appl. No.: 791,187

[52] U.S. Cl. ................................................. 99/94
[51] Int. Cl. .................................. A21d 1/10, A23l 13/08
[58] Field of Search .......................... 99/92, 94, 141

[56] References Cited

UNITED STATES PATENTS

| 2,311,235 | 2/1943 | Kuderman | 99/141 |
| 3,170,796 | 2/1965 | Andre et al. | 99/94 |
| 3,397,996 | 8/1968 | Darragh et al. | 99/118 |

FOREIGN PATENTS OR APPLICATIONS

| 462,986 | 3/1937 | Great Britain | 99/141 |

OTHER PUBLICATIONS

Food Ingredients— Monsanto Co. 1966 page 19
Food Engineering, January 1966 page 138

*Primary Examiner*—Raymond N. Jones
*Attorney*—Dominik, Knechtel & Godula

[57] ABSTRACT

A dietary dry cake mixture which is free of sugar and which has a sorbitol to flour ratio of about 55 percent to about 110 percent. The cake mixture has a shortening portion including a minor amount of emulsifiers and a major amount of liquid vegetable oil or plastic shortening. An emulsion enhancer is combined with the emulsifier in the shortening portion.

7 Claims, No Drawings

3,658,553

DIETARY DRY CAKE MIX

This invention relates to dry cake mixtures, in particular, dietary dry cake mixtures which are free of sugar. The invention further relates to cakes prepared from the cake mixtures which have desirable sweetness, as well as improved taste and texture qualities.

It is desirable, for reasons of diet, to provide a reduced calorie cake, and such a cake may be obtained by means such as reducing the shortening content therein. The lower calorie cake is particularly obtained by providing a form which has little or no sugar. Not only are calories reduced with sugar elimination, but this carbohydrate form is eliminated to meet certain health requirements such as diabetes mellitus.

It is known that the material sorbitol is not inimical to diabetics, and has inherent sweetness, but of a lower order. It is known that sorbitol has about one-half the sweetness of sucrose, consequently, this material is a popular subject of investigation as a possible substitute for sugar in food preparations. Sorbitol has been used to replace sugar in candies, jams, cookies, and sorbitol has been added to freshly prepared cake batters specially mixed for dietetic purposes.

The substitution of sorbitol for sugar in special baking techniques is a procedure which requires some skill and careful attention. It is not convenient nor simple for the average user to acquire such skills or to direct the necessary attention to details required for successfully making such dietary cakes containing sorbitol. It would be desirable to provide a dry cake mixture which can be simply and conveniently handled by the average user so that a successful and tasty cake may be prepared therefrom. It is desirable that a mixture be provided which preferably requires only added water prior to baking. It is likewise desirable that the cake baked from such a simple mixture have desired levels of moisture retention and palatability. The moisture retention is a feature of palatability, and it is also a property which extends the keeping quality of the cake. It is understood that a cake prepared from such a dry mixture be free of sugar and contain sorbitol in amounts which leads to the desired moisture retention, desired volume and cake texture.

It is accordingly one important object of the present invention to provide a dry dietary cake mixture which can be simply processed by the average user to provide a dietary cake having no sugar, but still providing desired sweetness levels as well as other desired properties.

It is another important object of the invention to provide a dietary dry cake mixture which is free of sugar and which contains sorbitol in particular amounts necessary to provide a cake having the desired sweetness and moisture retention.

Yet another important object of the invention is to provide a dietary dry cake mixture which is sugar free and in which particular amounts of sorbitol are combined with particular amounts of emulsifiers in a shortening portion to obtain a cake having improved features of palatability, texture and lightness.

Still another important object of the invention is to provide a dietary dry cake mixture which is free of sugar, which has a particular sorbitol ratio, and which has a shortening portion including particular amounts of an emulsifier and an emulsifier enhancer so that a successful cake can be baked following simple combination of the mixture with water to obtain the batter.

Objects such as the foregoing are attained, together with still other objects which will occur to practitioners from time to time, by the invention described in detail in the following disclosure.

It has been found that a dietary dry cake mixture may be provided with a non-shortening portion having a particular sorbitol ratio, and a shortening portion having an emulsifier part and a fat part which may be a liquid vegetable oil or a plastic shortening. For purposes of the present disclosure, the term "sorbitol ratio" is used in a way equivalent to the term "sugar ratio" which is well known in the baking art. For example, a sugar ratio of 100 percent means a ratio of 1 part sugar to 1 part cake flour, by weight. A sugar ratio of 50 percent would mean one-half part sugar to one part cake flour by weight, and so on. In the same way, the sorbitol ratio will be defined herein in percentage terms to represent the ratio of parts by weight of sorbitol to parts by weight of cake flour. It has been found that particular sorbitol ratios are required to obtain the successful prepared dry cake mixtures of this invention. It has also been found that the shortening portion requires particular minor amounts of a primary emulsifier to be used in combination with the particular sorbitol ratios. As is well known, a primary emulsifier in the cake baking art means a material which leads to incorporation of air into a cake batter. This is important to attain the desired lightness, volume, and tenderness of the cake.

The specific gravity of the cake batter is one index for determining whether the cake will have the desired high volume, lightness and tenderness.

The primary emulsifiers or surfactants may be selected from the many which are suitable for addition to foodstuffs. It has been found that such primary emulsifiers should comprise from about 1 percent to about 20 percent by weight of the shortening portion. In particular, the successful results are obtained by employing from about 5 percent to about 12 percent by weight of the emulsifiers in the shortening portion.

It has also been found that successful cakes are obtained from a prepared cake mixture in which small amounts of the shortening portion are present relative to the non-shortening portion. This is desirable to further reduce the caloric content of the cake. In general, about 4 ½ parts of the non-shortening portion is combined with about 1 part of the shortening portion, or less than 1 part, say about 0.8 parts. A minor amount of the shortening portion includes the emulsifier by which is meant one emulsifier or a mixture of emulsifiers. In one preferred embodiment, the emulsifier part of the shortening portion includes an emulsion enhancer which is stearyl monoglyceridyl citrate. It has been found that this enhancer may be added from about 0.25 percent to about 6 percent by weight of the shortening portion. This enhancer has been disclosed by the present applicant in his issued U. S. Pat. No. 3,227,559. The use of stearyl monoglyceridyl citrate as an emulsion enhancer or stabilizer has also been disclosed relative to high fat emulsions in U. S. Pat. No. 3,353,965. A technical article about the properties of this enhancer has been presented in the Journal of the American Oil Chemists Society, Vol. 41, pages 92–94.

Representative illustrations of the type of primary emulsifiers which can be used in the dry cake mixture include lactic acid esters of monoglyceride and diglyceride, also known in the art as glyceryl-lacto esters of fatty acids or lactated monoglycerides and diglycerides, hereinafter also referred to collectively by the symbols LMG. Other useful primary emulsifiers are propylene glycol monostearate (PGMS); glyceryl lacto-stearate (GLS); glyceryl monostearate (GM); stearoyl lactic acid (SLA); stearoyl-lactylic acid ($S_2LA$); SLA + $S_2LA$, supplied by Durkee Foods and others. The stabilizer enhancer, stearoyl monoglyceridyl citrate, will also be referred to herein by the further symbols SMGC. The recited range for the primary emulsifiers, namely, 1–20 percent by weight of the shortening portion, is operable but preferred selections may be made within such range. Some primary emulsifiers operate best at a range such as 1–10 percent by weight of the shortening, for example, SLA and $S_2LA$. Other primary emulsifiers may operate at another range, say, 4–20 percent by weight of the shortening; for example, PGMS, GLS, and LMG. The practitioner may easily select the particular concentration of primary emulsifier within the prescribed range by noting the specific gravity of the batter, the volume of the resulting cake, its texture and lightness.

The following examples are presented to teach various means for practicing the invention, including the mode best contemplated at present. It should be understood, however, that such embodiments are not intended to represent exclusive teachings.

EXAMPLE I

WHITE CAKE MIX

NON-SHORTENING PORTION

| Ingredient | Ounces | Grams |
|---|---|---|
| Cake flour | 7¼ | 203 |
| Starch | ½ | 14 |
| Sorbitol | 6.0 | 168 |
| Skim milk solids | 0.9 | 25 |
| Dried egg whites | 1.0 | 28 |
| Vanillin on powdered base | ¼ | 7 |
| Salt, 1 tsp. (5.3 gm) | – | 14 |
| Baking powder | 0.4 | 11 |
| Artificial sweetner | – | 1 |

SHORTENING PORTION

| Ingredient | Grams |
|---|---|
| Liquid vegetable oil shortening | 70 |
| Primary emulsifier | 10 |

The synthetic sweetener in the non-shortening portion is a mixture of 10 parts of calcium cylcamate to 1 part sodium saccharine. The vegetable oil in the shortening portion is corn oil, cottonseed oil. The primary emulsifier in this example is PGMS.

The non-shortening portion and the shortening portion may be mixed and stored until ready for conversion into a batter and baking into a cake. The shortening and non-shortening portion may, alternatively, be maintained separately until mixed just prior to combining with liquid for preparing the batter. Some stability problems may arise by combining the shortening portion with the non-shortening portion, especially upon prolonged standing. Any threat of instability may be markedly reduced by using a more stable liquid shortening such as Durkex 500, a high stability oil supplied by Durkee Foods. Plastic shortenings may be used in place of the liquid triglycerides which also extend stability.

EXAMPLE II

WHITE CAKE PREPARATION

The non-shortening and shortening portions of Example I are mixed, and 8 ounces of cold tap water are added to the mixture. The water and dry portions are then mixed at speed No. 1 on a Sunbeam mixmaster, with the aid of a spatula to move the dry ingredients into contact with the liquid. Mixing is continued for one minute at speed No. 12, thereupon an additional 4 ounces of cold tap water are added, blended in gently, and mixed for three minutes at speed No. 7, using a spatula to obtain a uniform batter. The specific gravity of the batter is about 0.78–0.80. The cakes are baked by depositing 13 ounces of the batter in each of two 8 inch greased pans, and baking at 365° F. for 25–30 min. The remaining batter for the mixture is used to bake cupcakes. The resulting cake has a desirably sweet taste, is tender and light, and has a good texture. The volume of the cake is between 1,150 ml. and 1,120 ml. The lightness and high volume of the cake is related to the desired specific gravity determination of the batter.

EXAMPLE III

The non-shortening portion of Example I is combined with a shortening portion prepared from the following ingredients.

| Ingredients | Grams |
|---|---|
| PGMS | 4 |
| LMG | 4 |
| SMGC | 2 |
| Hydrogenated plastic shortening | 70 |

The above shortening portion includes a mixture of primary emulsifiers and the emulsion enhancer SMGC, which makes up about 12 percent of the mixture, the plastic shortening being about 88 percent of the mixture. The dry cake mixture is combined with water according to the process steps described in Example II, and a white, smooth batter is obtained having a specific gravity of 0.93. A cake is baked by depositing 14 ounces of batter in each of two 8 inch greased pans. The resulting cake has a volume of 1,120 ml. The cake is tender and acceptable as to flavor.

Five white cake mixes were made by using the ingredients of Example I, except that different primary emulsifiers were used, each emulsifier present in an amount of 12.5 percent by weight of the shortening portion. The following Table I lists the different primary emulsifiers, describes some properties of the batter, lists the volume of the prepared cake, and describes some qualities of the prepared cake. The palability rating is a semiquantitative taste test utilizing numbers from 1 to 10, No. 1 indicating the highest rating and No. 10 the lowest. It is a composite rating of taste, aroma, mouth feel and ease of swallowing.

The following Table II represents data from six different white cakes prepared from the portions of Example I, except that different primary emulsifiers are employed, and an emulsifier enhancer is added in different amounts.

It will be seen from the foregoing Table II that varying percentages of primary emulsifiers and the emulsifier enhancer, within the prescribed ranges, generally lead to acceptable cakes. It can be further seen that specific gravities of the batters fall within the range of about 0.6 to about 0.8 except for one cake which has a higher specific gravity of 1.02 and a smaller resulting volume.

The following Table III presents the results of three cakes made essentially from the mixtures presented in Example I, except that different amounts of sorbitol are employed for each cake; and the shortening portion is cottonseed oil instead of plastic shortening. It is seen that the palatability rating is high for the sorbitol ratios employed, and that the specific gravities of the batters are between 0.7 and 0.8. The volumes are high for all the cakes and the general cake structure is of good quality.

TABLE I
[Comparative evaluations of primary emulsifiers—white cakes]

| Emulsifier type | Percentage of shortening | Batter Sp. g. | Batter Comments | Volume, ml. | Cake Taste | Cake Structure | Palatability rating, 1–10 |
|---|---|---|---|---|---|---|---|
| (PGMS P-06) 90% PGMS | 12.5 | 0.74 | Thick, white and smooth | 1,150 | Slightly dry. | Slightly coarse, even, firm | 4 |
| (Myverol 18-100) 90% GM | 12.5 | 0.75 | Fluid, white and smooth | 1,200 | Dry | Slightly coarse, even, split top | 6 |
| (Drewpol 3-1-S) PGS | 12.5 | 0.96 | Thin, white and smooth | (¹) | Dry | Coarse, poor cake | 10 |
| (Marvic acid) SLA+S₂LA | 12.5 | 0.64 | Very thick, white and smooth | 1,155 | Dry | Slightly coarse, even, very pale top, firm | 6 |
| LMG | 12.5 | 0.81 | Thick, white and smooth | 1,200 | Slightly dry. | Slightly coarse, firm, brown top, even | 4 |

¹ Small sides, small volume.

TABLE II

[Comparative evaluations of primary emulsifier with stabilizer enhancer—white cake]

| Emulsifier type | Percent of shortening | Percent citrate esther of shortening (SMGC) | Batter | | Cake | | Palatability rating |
|---|---|---|---|---|---|---|---|
| | | | Sp. g. | Comments | Volume, ml. | Structure | |
| PCMS P-06 | 12.5 | 2.5 | 0.74 | White and smooth | 1,155 | Tender, good mouth feel | 3 |
| Myverol 18-100 | 12.5 | 2.5 | 1.02 | Thin, slightly yellow | 1,040 | Pale top | 5 |
| Marvic acid | 10.0 | 2.5 | 0.64 | Very thick, white and smooth | 1,160 | Very firm | 5 |
| Do | 6.25 | 6.25 | 0.66 | Thick, white and smooth | 1,190 | Center fell slightly, firm | 5 |
| GLS | 8.85 | 3.75 | 0.75 | ....do | 1,180 | Tender, pale top | 3 |
| LMG | 5.0 | 2.5 | 0.77 | ....do | 1,170 | Tender, good eating | 2 |
| PGMS | 5.0 | | | | | | |

TABLE III

[Effect of varying sorbitol ratio—white cake]

| Weight of sorbitol to 7¼ oz. flour | Specific gravity of batter—comments | Ml. volume of cake for 14 oz. of batter | Cake tops, appearance | Cake structure | Palatability rating, 1-10 |
|---|---|---|---|---|---|
| 4 oz. (55%) | 0.73, smooth, white and thick. | 1,100 | Pale yellow, not attractive. | Sides and shape good, tender but slightly firm, fine and even. | 2 |
| 6 oz. (83%) | 0.77, smooth, white and thick. | 1,140 | Medium brown, attractive. | Sides and shape excellent, fine and even, tender, excellent mouth feel. | 1 |
| 8 oz. (110%) | 0.78, smooth, white and fluid. | 1,110 | Darker medium brown, attractive. | High shrinkage, structure very tender, fine and even, excellent tasting and mouth feel. | 1 |

The dry dietary cake mix disclosed herein may comprise the shortening and non-shortening portions mixed together, but such mixture will place some limitations on the shelf stability because of oxidation of the fatty triglycerides. This can be countered by use of higher stability fats or by inclusion of acceptable antioxidants. The cake mix may also be provided as a mixture of the non-shortening portion with admixed primary emulsifiers and the emulsion enhancer, where desired. The required amounts of shortening and liquid may then be added at the time the batter is prepared. Also, the emulsifier and emulsion enhancer may be added to the dry non-shortening portion at the time the batter is prepared.

Some primary emulsifiers may not result in a cake having the volume and lightness obtained with other emulsifiers, but the practitioner may readily determine such qualities by visual inspection and measurements.

The primary emulsifiers and the emulsion enhancer should be added within the prescribed ranges, but the practitioner may readily select particular amounts within such ranges by again simply noting the visual appearance and making measurements, such as the specific gravity of the batter and the volume of the cake. The same standards will operate in selecting the particular sorbitol ratio within the prescribed range, as well as varying the relative proportions of the shortening and non-shortening portions within the prescribed range.

It will be understood that stable and substantially dry confectioneries, such as chocolate or cocoa powder, may be incorporated, as well as flavorings in solid form or adsorbed onto carriers, as well as absorbed within carriers.

The invention may now be practiced in various ways which include departures from the exact teachings herein, but it should be understood that such departures will comprise a part of the invention so long as they come within the terms of the following claims as given further meaning by the language of the preceding specification.

What is claimed is:

1. In a dietary sugar-free dry cake mix having flour, shortening, and primary emulsifier, the improvement wherein
    sorbitol is present in an amount so that the sorbitol-cake flour ratio is from about 55 percent to about 110 percent,
    the primary emulsifier being present in an amount of about 1 percent to about 20 percent by weight of the shortening, and
    said cake mixture further containing non-caloric artificial sweetener in an amount sufficient to impart desired sweetness, whereby said dry mix provides a suitable batter by admixture with water alone,
    and the cake resulting therefrom upon baking said batter has the desired moisture retention, volume and texture.

2. A dietary dry cake mixture as in claim 1 wherein said primary emulsifier is present in an amount of about 5 percent to about 12 percent by weight of the shortening.

3. A dietary dry cake mixture as in claim 1 which further includes from about 0.25 percent to about 6 percent of stearyl monoglyceridyl citrate as an emulsifier enhancer.

4. A dietary dry cake mixture as in claim 1 wherein said cake mixture includes about 450 parts of a non-shortening portion to about 80 parts of a shortening portion, said shortening portion having about 10 percent primary emulsifier, about 3 percent of stearyl monoglyceridyl citrate as an emulsifier enhancer, and the balance being selected of the class of plastic shortening and vegetable liquid oil shortening.

5. A dietary dry cake mixture as in claim 4 wherein the non-shortening portion includes about 200 parts cake flour, about 160 parts of sorbitol, about 25 parts skimmed milk solids, about 25 parts of dried egg whites, about 10 parts leavening agent, and about 1 part of the artificial non-caloric sweetener.

6. A dietary dry cake mixture as in claim 1 wherein the mixture includes a non-shortening portion and a shortening portion, said shortening portion comprising a minor amount of emulsifier and a major amount of fat selected from the class consisting of liquid vegetable oils and hydrogenated plastic shortening.

7. A dietary dry cake mixture as in claim 1 wherein said mixture includes a non-shortening portion and a shortening portion, said shortening portion comprising minor amounts of emulsifier having about 4 parts propylene glycol monosterate, about 4 parts lactated monoglycerides and diglycerides, and about 2 parts stearyl monoglyceridyl citrate as an emulsion enhancer, and a major amount of a fat selected from the class consisting of liquid vegetable oil and hydrogenated plastic shortening.

* * * * *